(12) United States Patent
Green, Jr.

(10) Patent No.: US 6,400,326 B1
(45) Date of Patent: Jun. 4, 2002

(54) ANTENNA BOOSTER SYSTEM FOR AUTOMOBILE

(75) Inventor: Donald R. Green, Jr., San Marcos, CA (US)

(73) Assignee: Denso Corporation, Ltd., Aichi-ken (JP)

( * ) Notice: Subject to any disclaimer, the term of this patent is extended or adjusted under 35 U.S.C. 154(b) by 0 days.

(21) Appl. No.: 09/368,052

(22) Filed: Aug. 3, 1999

(51) Int. Cl.[7] ................................................ H01Q 1/32
(52) U.S. Cl. ...................... 343/713; 343/711; 343/718; 343/793; 343/876; 343/895; 455/575
(58) Field of Search ................................ 343/713, 711, 343/712, 714, 702, 718, 793, 893, 895, 876, 872, 905, 906, 700 MS; 455/95, 99, 345, 351, 82, 575, 90

(56) References Cited

U.S. PATENT DOCUMENTS

| | | | | |
|---|---|---|---|---|
| 5,515,419 A | * | 5/1996 | Sheffer | 379/58 |
| 5,600,333 A | * | 2/1997 | Justice et al. | 343/713 |
| 5,659,888 A | * | 8/1997 | Kato et al. | 455/575 |
| 5,801,661 A | * | 9/1998 | Suzuki | 343/702 |
| 5,918,162 A | * | 6/1999 | Ito et al. | 343/713 |
| 5,933,118 A | * | 8/1999 | Kakizawa | 343/713 |
| 5,959,584 A | * | 9/1999 | Gorham et al. | 343/711 |
| 5,990,840 A | * | 11/1999 | Chang | 343/713 |
| 6,031,492 A | * | 2/2000 | Griffin et al. | 343/702 |
| 6,031,499 A | * | 2/2000 | Dichter | 343/713 |
| 6,069,588 A | * | 5/2000 | O'Neill, Jr. | 343/713 |
| 6,078,294 A | * | 6/2000 | Mitarai | 343/713 |

* cited by examiner

*Primary Examiner*—Don Wong
*Assistant Examiner*—Thuy Vinh Tran
(74) *Attorney, Agent, or Firm*—Fish & Richardson P.C.

(57) ABSTRACT

An antenna system for an automobile uses an external antenna that is either connected to the cell phone directly, or connected to a passive antenna that communicates with the cell phone.

8 Claims, 1 Drawing Sheet

ANTENNA BOOSTER SYSTEM FOR AUTOMOBILE

BACKGROUND

Cellular telephones are often used in automobiles.

A cellular telephone can be used in a car kit. The car kit holds the telephone and has connections to provide power to the cellular telephone. The car kit often operates in hands-free mode, so that the call is carried out in speakerphone mode.

The car kit can be placed up high, above the chassis of the automobile. This puts the cell phone closer to the glass and allows better reception. However, this location can be less aesthetically pleasing.

A less-intrusive mounting places the cell phone down lower—below the auto chassis, e.g. in an arm rest. Reception would often be impaired at this location because of interference from the chassis of the automobile. Therefore, this type of mounting can include a connection to an external antenna.

This external antenna can provide additional gain for the cellular transmission and reception, e.g. 6 dbi of gain.

The user often wants to conduct a private conversation. Therefore, the user may remove the handset from the car kit for a private conversation in the vehicle. The handset's connection to the external antenna is lost when the phone is removed from its cradle. For a short time, until the phone is brought up to the user's ear, the shielding of the vehicle cab could shield the signal and reduce the signal strength. This could cause the call to be dropped.

SUMMARY

The present system uses an in-vehicle passive antenna, within the car kit, to connect signal to the external antenna when the portable phone is not resting within the kit.

The in-vehicle antenna is passive in the sense that it couples RF transmissions and receptions to and from the cell phone when the handset is not docked. Therefore, when the cell phone is removed from the car kit, the connection to the external antenna can still assist handset transmission and reception. The passive connection is the effective when the cell phone antenna is closest to the car kit, e.g. when the cell phone is being docked and undocked.

According to a disclosed mode, an electronic or mechanical switch switches the connection between electrical connection to the external antenna and passive connection to the external antenna, depending on whether the cell phone is connected or removed.

BRIEF DESCRIPTION OF THE DRAWINGS

These and other aspects will now be described with reference to accompanying drawings, wherein.

DESCRIPTION OF THE PREFERRED EMBODIMENTS

Figure 1:
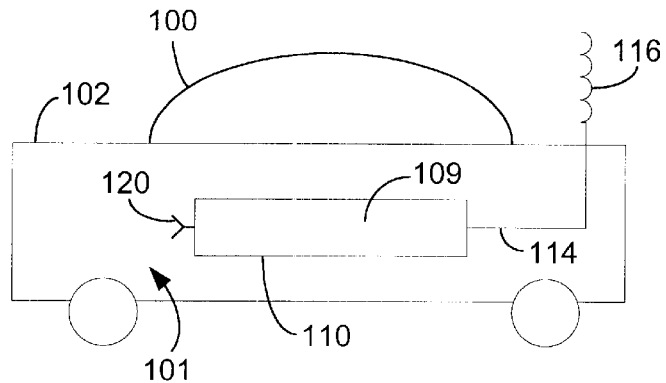
FIG. 1 shows an overall diagram of the car showing the shaded reception area.

An embodiment is shown in FIG. 1, which shows an automobile including a glass area 100 e.g. a windshield, a metal chassis area 102 defining an RF-shaded area 101 therein, and cell phone car kit 110. The car kit 110 can be for any type of portable telephone including but not limited to cellular, FM, PCS or any type of digital telephone. The car kit 110 has a housing 109 with a cell phone cradle which is preferably located within the RF-shaded area 101 of the automobile. This portion 101 is shaded by the metal chassis 102 of the car. Therefore, the reception in this area 101 can be relatively attenuated.

Car kit 110 is connected via a transmission line 114 to an external antenna 116. The external antenna 116 may provide a typical 6 dbi of gain, while the transmission line 114 may provide 1 to 1½ dbi of loss.

Figure 2:
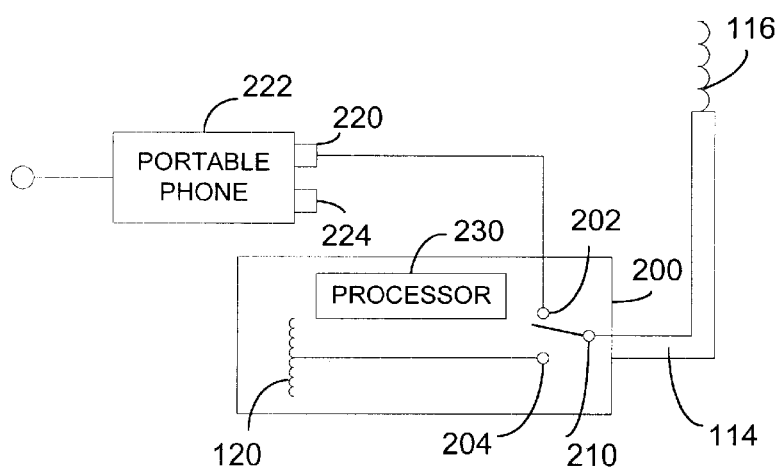
FIG. 2 shows a first switched connection.

The car kit 110 also includes a passive antenna 120 connected as shown in FIG. 2.

FIG. 2 shows a more detailed diagram of the switching system used in the car kit 110 of FIG. 1. Antenna 120 is here shown as a tuned passive dipole. A switch 200 is connected at one end 210 to external antenna 116 via transmission line 114. The other end of the switch 200 has two connections 202 and 204. Connection 202 is connected to a contact 220 of the cellular telephone 222.

The cellular telephone provides its RF transmission and reception over the contact 220. When the cell phone is in place on its cradle, therefore, transmission and reception occur via contact 220 through switch contact 202 to switch contact 210, to transmission line 114 to external antenna 116.

Other contacts to the cell phone are also made shown generically as contact 224. In this embodiment, contact 224 can include a source of DC power.

A processor 230 within the car kit detects power consumption of the cell phone 222, and controls the position of the switch accordingly. When the cell phone is consuming power, the switch is in the position shown in FIG. 2. When no power is consumed, the switch is quickly switched to its other position.

As shown, the other position connects contact 210 to contact 204 and thereby connects the internal dipole 120 to the external antenna 116.

Figure 3:
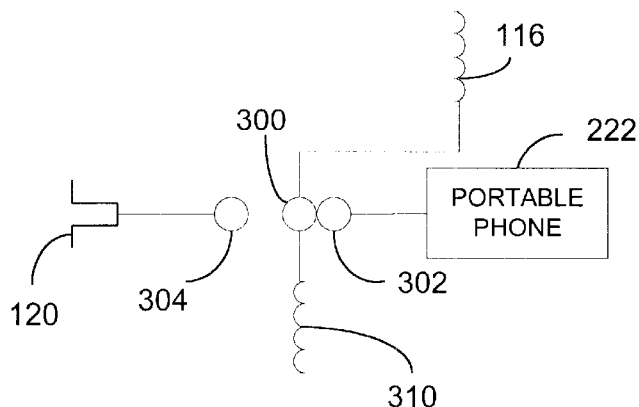
FIG. 3 shows a switched connection with a purely mechanical switch.

An alternative embodiment is shown in FIG. 3. In this alternative embodiment, the switch 299 is a purely mechanical switch. The switch is actuated by the act of physically inserting the cell phone 222 into the car kit. Contact 300 is mounted on a leaf spring 310. When the cell phone is inserted, the act of insertion presses the contact 300 against the contact 302. When the cell phone is removed, contact 300 is pressed against contact 304 which is connected to the internal dipole 120.

The dipole antenna 120 can simply be a line of metalized foil, set into a desired shape. As shown in FIG. 2, the antenna 120 is preferably etched into a metal foil on either the outside, inside or mid portion of the physical car kit. Therefore, the cost of this antenna is relatively minimal.

While this embodiment is described using a passive dipole, the internal antenna could alternatively be a helix type antenna, a patch type antenna, an inverted F type antenna or any other type of antenna known in the art.

What is claimed is:

1. A system for a vehicle-mounted portable phone, comprising:
    a first antenna, mounted external to the vehicle;
    a second antenna mounted internal to the vehicle; and
    a car-mounted part, having surfaces for accepting and allowing recharging of a portable phone;
    an electrically operated switch selectively connecting said second antenna to said first antenna, said switch operating to sense current flow charging said portable phone, and to change a position of said switch based on whether said current is flowing.

2. A system as in claim 1, wherein said second antenna is a dipole.

3. A system as in claim 1, wherein said second antenna is one of a dipole antenna, a helix antenna, a patch antenna, or an inverted F-type antenna.

4. A vehicle kit for a portable telephone, comprising:

a housing, including at least two contacts therein, a first contact being an antenna contact which is located to connect to an antenna of the portable phone, and a second contact being a contact for connecting to some other feature of the portable phone, said housing also including a cradle area that is sized for receiving said portable phone therein;

a transmission line, connected between said housing and an external antenna;

a second antenna also connected to said housing; and an electrically controllable switch, detecting whether said portable telephone is inserted in said housing by detecting current flow in said telephone, and based on said detecting, connecting said antenna contact on said cellular phone to said external antenna, and if not, connecting said second antenna to said external antenna.

5. A system as in claim 4, wherein said second antenna is a dipole antenna.

6. A method of operating a telephone, comprising:

first, determining if a portable telephone is attached to a car kit by detecting current flow to said portable telephone;

connecting said portable phone directly to an external antenna, if so connected; and otherwise, connecting a passive internal antenna to said external antenna.

7. A method as in claim 6, wherein said determining comprises detecting power consumption.

8. A method as in claim 6, wherein said determining comprises detecting a physical position.

* * * * *